United States Patent [19]

Soranno et al.

[11] Patent Number: 5,628,476
[45] Date of Patent: May 13, 1997

[54] ENCAPSULATING SERVICE MODULE FOR EMERGENCY DESCENT VEHICLES

[75] Inventors: Kevin A. Soranno, Redondo Beach; David L. Younkin, Los Alamitos, both of Calif.

[73] Assignee: TRW Inc., Redondo Beach, Calif.

[21] Appl. No.: 505,922

[22] Filed: Jul. 24, 1995

Related U.S. Application Data

[63] Continuation of Ser. No. 110,470, Aug. 20, 1993, abandoned.

[51] Int. Cl.$^6$ ..................................................... B64G 1/22
[52] U.S. Cl. ................................. 244/158 R; 244/160
[58] Field of Search ........................... 244/158 R, 172, 244/160, 138 R

[56] References Cited

U.S. PATENT DOCUMENTS

| | | | |
|---|---|---|---|
| 3,286,951 | 11/1966 | Kendall | 244/160 |
| 3,606,212 | 9/1971 | Paine | 244/160 |
| 5,064,151 | 11/1991 | Cerimele et al. | 244/160 |
| 5,158,248 | 10/1992 | Mockovciak, Jr. | 244/160 |

*Primary Examiner*—Galen L. Barefoot
*Attorney, Agent, or Firm*—Michael S. Yatsko

[57] ABSTRACT

An encapsulating service module for constructing a short, compact emergency descent vehicle which can be easily loaded into a space shuttle cargo bay with minimum volume. The encapsulating service module includes an annular-shaped support structure for attachment around a spacecraft module and various service module components mounted to the support structure. These service module components include propellant tanks, main and reaction control system (RCS) thrusters, environmental control and life support system tanks, and avionics and battery units. A micrometeoroid shield is included either as a separate structure or is integral with the encapsulating service module to protect the service and spacecraft modules from the space environment. The spacecraft module can be an Apollo-type command module, a Soyuz-type vehicle, or any other type of manned or unmanned spacecraft.

9 Claims, 5 Drawing Sheets

ENCAPSULATING SERVICE MODULE FOR EMERGENCY DESCENT VEHICLES

This application is a continuation of U.S. patent application Ser. No. 08/110,470, filed Aug. 20, 1993, now abandoned.

BACKGROUND OF THE INVENTION

This invention relates generally to manned spacecraft and, more particularly, to emergency descent vehicles for crews of orbiting space stations.

The U.S.-built space station Freedom will require one or more emergency descent vehicles to bring some or all of the crew members safely back to earth in the event of an emergency, such as a medical problem with a crew member or a major malfunction of the station. Several types of emergency descent vehicles are presently being considered. One type is a variant of the U.S.-built Apollo spacecraft. The Apollo spacecraft variant includes an Apollo-type pressurized command module which is attached to an unpressurized service module through the aft heat shield of the command module. The command module provides life support during orbit prior to reentry and is used for reentry and landing on the earth's surface. The service module provides propulsion and electrical power during orbit, and is separated from the command module prior to reentry and allowed to burn up in the atmosphere.

Another type of emergency descent module being considered is a variant of the Russian-built Soyuz spacecraft, which is used to ferry crews back and forth to the Russian space station MIR. The Soyuz spacecraft variant includes a pressurized orbital module, a pressurized descent module, and an unpressurized service module. The orbital module provides life support during orbit prior to reentry, the descent module is used for reentry and landing on the earth's surface, and the service module provides propulsion and electrical power during orbit. The orbital and service modules are separated from the descent module prior to reentry and allowed to burn up in the atmosphere.

One or more of these emergency descent vehicles will be delivered to the space station by the U.S.-built space shuttle and docked at the space station for emergency use. However, previous Apollo and Soyuz spacecraft have been launched on expendable launch vehicles, which induce large axial loads and small lateral loads. The spacecraft were designed to withstand the large axial loads, but the small lateral loads allowed the spacecraft to be relatively long. Unfortunately, the space shuttle can induce large lateral loads, especially during a landing after an aborted mission, thus potentially inducing large bending loads at the module interfaces. Furthermore, the space shuttle cargo bay has a limited length and these relatively long spacecraft do not fit easily in the cargo bay, thus limiting flexibility in loading. In addition, launch costs are based on the length of the cargo, as well as its weight, resulting in much higher launch costs. Finally, the relatively small diameter of the Soyuz spacecraft compared to the shuttle cargo bay requires that a special launch cradle be used, which increases system costs, as well as launch costs because of the additional weight. Accordingly, there has been a need for a shorter, more compact emergency descent vehicle for launch by the space shuttle. The present invention clearly fulfills this need.

SUMMARY OF THE INVENTION

The present invention resides in an encapsulating service module for constructing a short, compact emergency descent vehicle which can be easily loaded into a space shuttle cargo bay with minimum volume. The encapsulating service module includes an annular-shaped support structure for attachment around a spacecraft module and various service module components mounted to the support structure. These service module components include propellant tanks, main and reaction control system (RCS) thrusters, environmental control and life support system tanks, and avionics and battery units. A micrometeoroid shield is included either as a separate structure or is integral with the encapsulating service module to protect the service and spacecraft modules from the space environment, including micrometeoroids, space debris, contamination and thermal fluctuations. The spacecraft module can be an Apollo-type command module, a Soyuz-type vehicle, or any other type of manned or unmanned spacecraft.

In a preferred embodiment of the present invention, the encapsulating service module includes a conical-shaped support structure for attachment around an Apollo-type command module and various service module components mounted externally on the support structure. A micrometeoroid shield is included as a separate structure, which is jettisoned from the command module prior to reentry. In another preferred embodiment of the present invention, the encapsulating service module includes a cylindrical-shaped load-bearing support structure for attachment around the Apollo-type command module and various service module components mounted internally on the support structure. A micrometeoroid shield is included as an integral part of the support structure to protect the vehicle from the space environment. The avionics and battery units are encased in modular units which can accessed from the exterior of the service module, thus allowing the modular units to be easily tested and replaced, if necessary, while in orbit. Interface trunnions are attached to the exterior of the support structure for attaching the emergency descent module to the shuttle cargo bay, thus eliminating the need for a special launch cradle.

In another preferred embodiment of the present invention, the encapsulating service module includes a cylindrical-shaped load-bearing support structure for attachment to the orbital module of a Soyuz-type vehicle and various service module components mounted internally on the support structure. A micrometeoroid shield is included as an integral part of the support structure to protect the vehicle from the space environment. The avionics and battery units are encased in modular units which can accessed from the exterior of the service module, thus allowing the modular units to be easily tested and replaced, if necessary, while in orbit. Interface trunnions are attached to the exterior of the support structure for attaching the emergency descent module to the shuttle cargo bay, thus eliminating the need for a special launch cradle. The service module is rigidly attached to the orbital module, thus joining the two structures into an integrated unit which is separated from the descent module prior to reentry. Therefore, only one debris management maneuver is required to safely dispose of both service and orbital modules after separation from the descent module, instead of the usual two maneuvers.

An emergency descent vehicle using the encapsulating service module of the present invention is a short, compact vehicle compared to vehicles with conventional aft-mounted service modules. The service module of the present invention allows two emergency descent vehicles using a Soyuz-type vehicle to fit in the shuttle cargo bay without extending into the cargo bay forward clearance zone. An emergency descent vehicle using the encapsulating service module of the present invention has a more favorable loads distribution for launch due to a reduction in the moment arms about the module interfaces. The main thrusters of the encapsulating service module face forward, which is the opposite direction of a conventional aft-mounted service module, thus allowing these thrusters to be used to back away from the space station. This eliminates the need for spring-based docking ejection mechanisms, which cause tip-off rates. An emergency descent vehicle using the encapsulating service module of the present invention can be easily increased in size to allow for additional crew members, thus accommodating an increase in the number of crew members at the space station without increasing the number of emergency descent vehicles and their station berthing ports.

It will be appreciated from the foregoing that the present invention represents a significant advance in the field of manned spacecraft. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 8a shows the two Soyuz-type emergency descent vehicles with conventional aft-mounted service modules and FIG. 8b shows the descent vehicles with encapsulating service modules in accordance with the present invention.

DETAILED DESCRIPTION OF THE PREFERRED EMBODIMENTS

Figure 1:
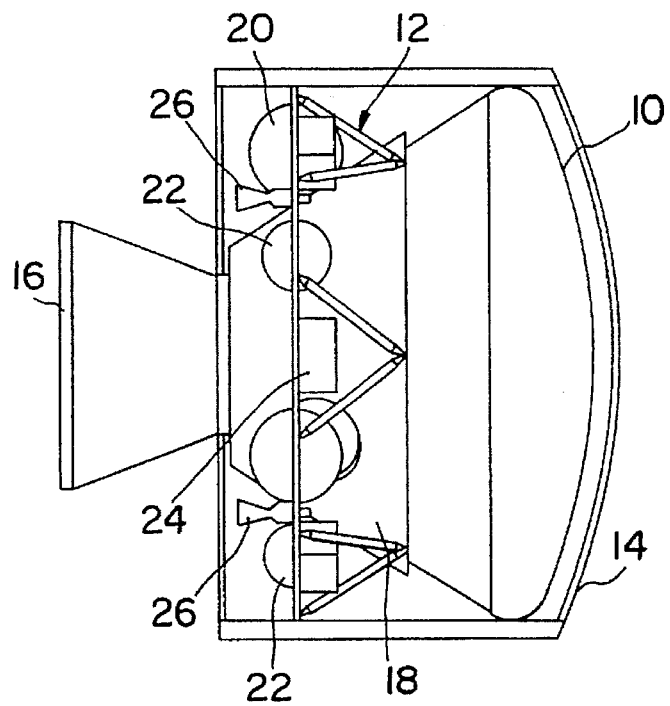
FIG. 1 is a sectional view of a conical-shaped encapsulating service module and separate micrometeroid shield for an Apollo-type command module.

As shown in the drawings for purposes of illustration, the present invention is embodied in an encapsulating service module for constructing a short, compact emergency descent vehicle which can be easily loaded into a space shuttle cargo bay with minimum volume. The encapsulating service module includes an annular-shaped support structure for attachment around a spacecraft module and various service module components mounted to the support structure. These service module components include propellant tanks, main and reaction control system (RCS) thrusters, environmental control and life support system tanks, and avionics and battery units. A micrometeoroid shield is included either as a separate structure or is integral with the encapsulating service module to protect the service and spacecraft modules from the space environment, including micrometeoroids, space debris, contamination and thermal fluctuations. The spacecraft module can be an Apollo-type command module, a Soyuz-type vehicle, or any other type of manned or unmanned spacecraft.

Figure 2:
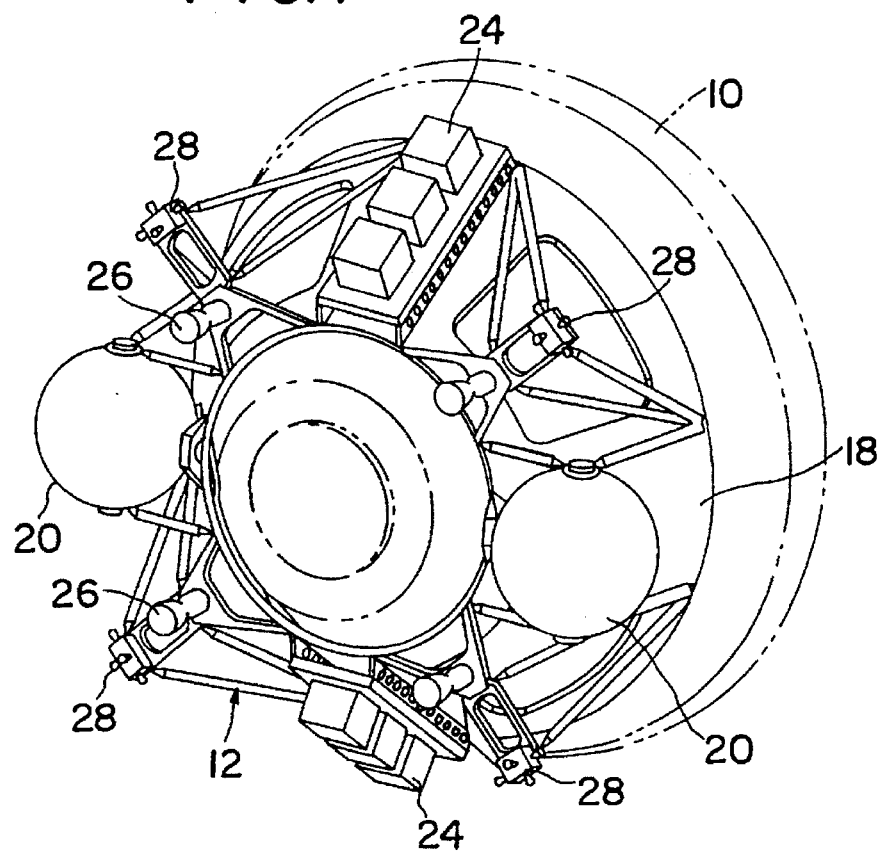
FIG. 2 is a perspective view of the conical-shaped encapsulating service module.
Figure 3:
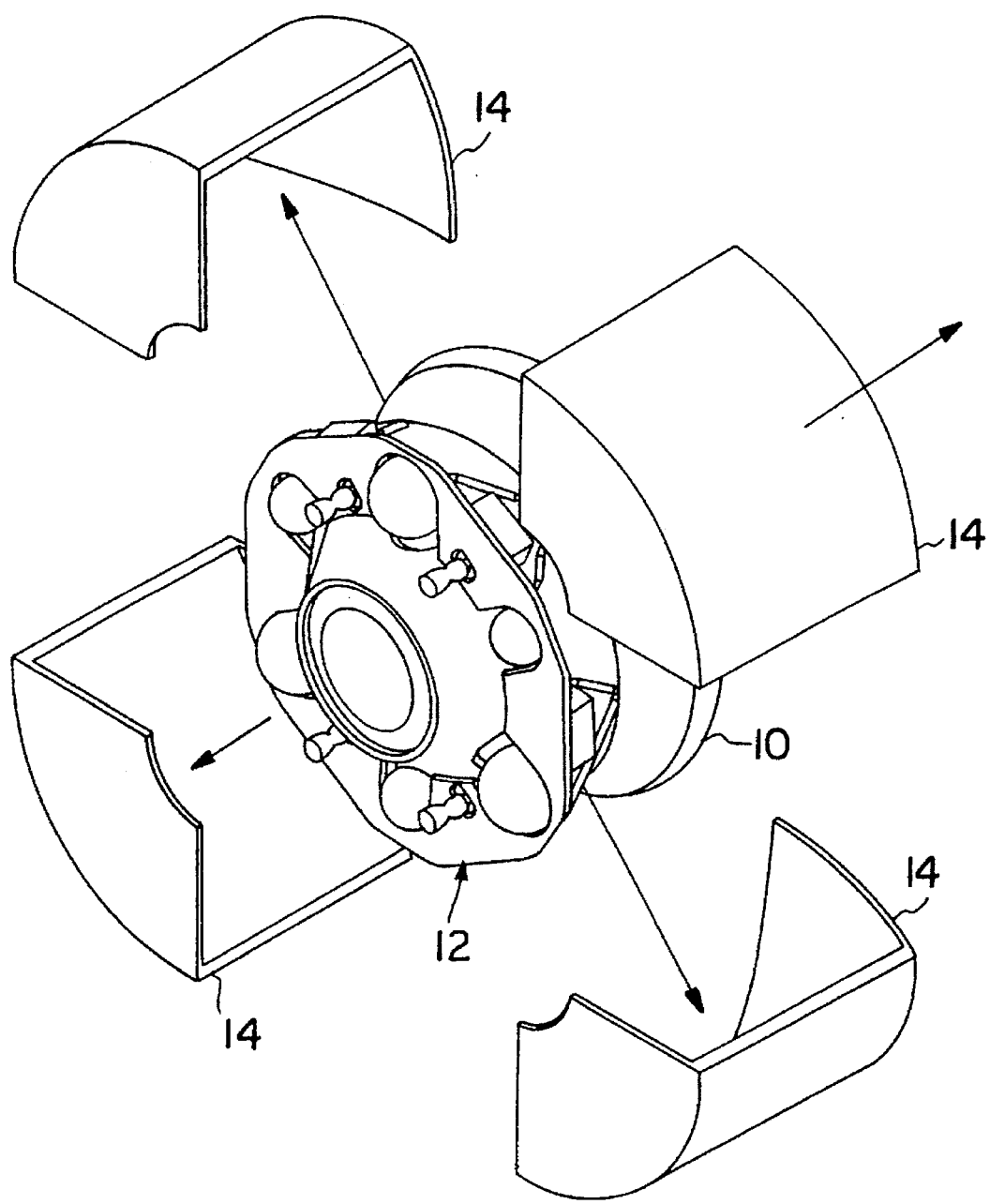
FIG. 3 is a perspective view showing a method for jettisoning the micrometeoroid shield prior to reentry for the conical-shaped encapsulating service module.

As shown in FIGS. 1–3, a preferred embodiment of the present invention for an Apollo-type command module 10 is a conical-shaped encapsulating service module 12 which is attached to the command module at its largest circumference forward of the aft heat shield. A micrometeoroid shield 14 is included as a separate structure to protect the vehicle from the space environment. A space station interface adapter 16 allows crew members to enter the command module 10 from the space station. The encapsulating service module 12 includes a conical-shaped support structure 18 for attachment around the command module and various service module components mounted externally on the support structure 18. These service module components include propellant tanks 20, environmental control and life support system tanks 22, avionics and battery units 24, main thrusters 26, and reaction control system (RCS) thrusters 28. The support structure 18 provides both a mechanical and utility interface between the service module 12 and the command module 10. Attaching the service module 12 forward of the command module 10 eliminates the need for an interface through the aft heat shield, thus simplifying the mechanical interface design. As shown in FIG. 3, the micrometeoroid shield 14 is jettisoned from the command module 10 prior to reentry and the encapsulating service module 12 is then separated from the command module 10.

Figure 4:
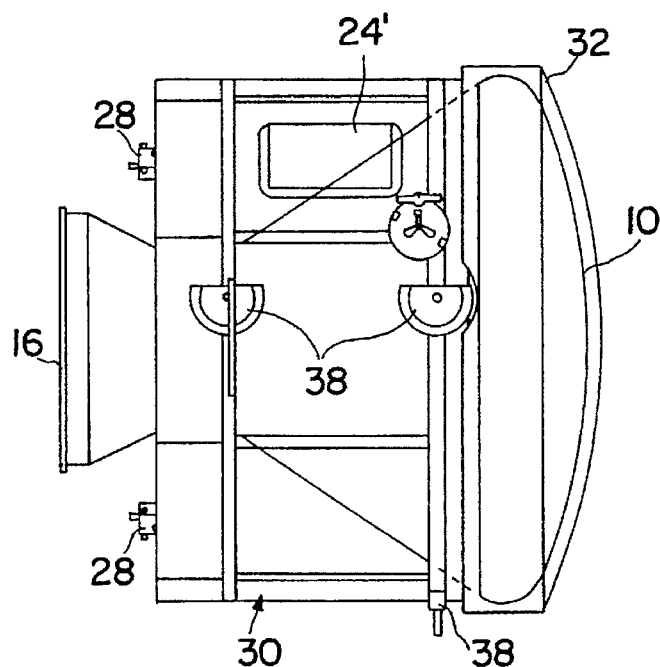
FIG. 4 is a sectional view of a cylindrical-shaped encapsulating service module having an integral micrometeoroid shield for an Apollo-type command module.
Figure 5:
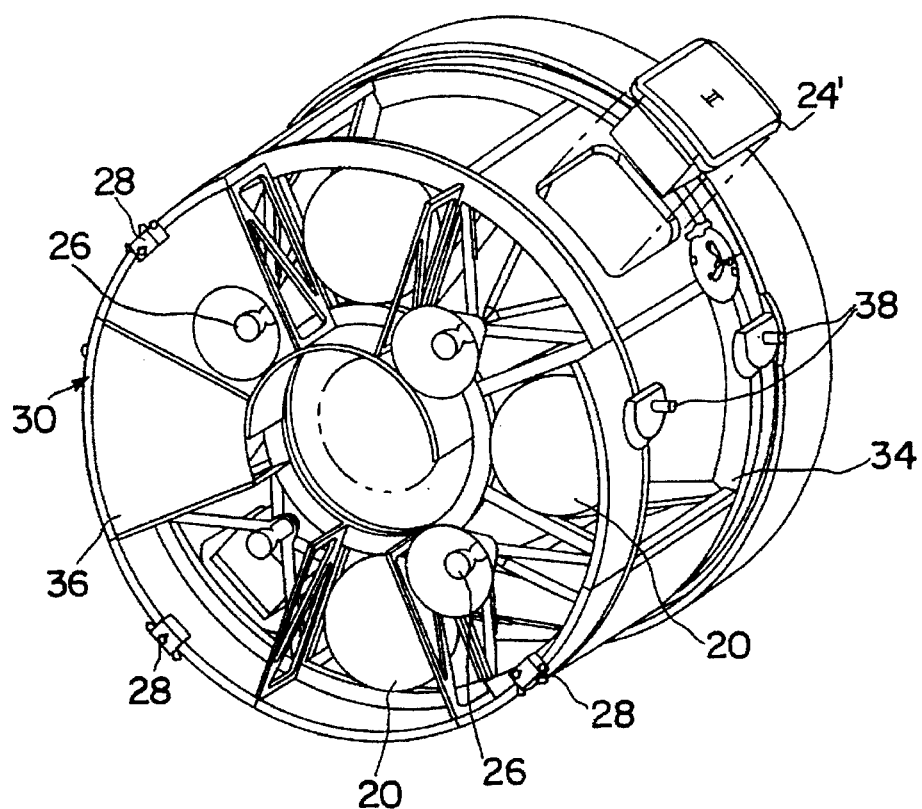
FIG. 5 is a partially-cut-away perspective view of the cylindrical-shaped encapsulating service module for the Apollo-type command module.

As shown in FIGS. 4 and 5, another preferred embodiment of the present invention for an Apollo-type command module 10 is a cylindrical-shaped encapsulating service module 30 having an integral micrometeoroid shield for protecting the vehicle from the space environment. A heat shield cover 32 protects the heat shield of the command module 10 from these same environmental conditions. The encapsulating service module 30 includes a cylindrical-shaped load-bearing support structure 34 for attachment around the command module and various service module components mounted internally on the support structure 34. These service module components include propellant tanks 20, environmental control and life support system tanks, avionics and battery units 24', main thrusters 26, and reaction control system (RCS) thrusters 28.

The avionics and battery units 24' are encased in modular units which can be accessed from the exterior of the service module 30, thus allowing the modular units to be easily tested and replaced, if necessary, while in orbit. The micrometeoroid shield is fabricated from micrometeoroid panels 36 which are attached to the support structure 34. Interface trunnions 38 are attached to the exterior of the support structure 34 for attaching the emergency descent module to the shuttle cargo bay, thus eliminating the need for a special launch cradle. The encapsulating service module 30 is jettisoned from the command module 10 prior to reentry by jettisoning the heat shield cover 32 and then separating the command module from the service module.

Figure 6:
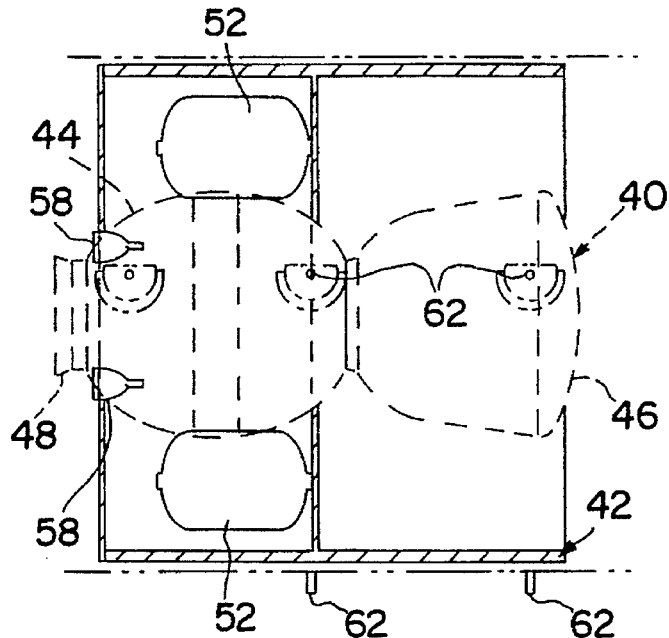
FIG. 6 is a sectional view of a cylindrical-shaped encapsulating service module having an integral micrometeoroid shield for a Soyuz-type orbital module and descent module.
Figure 7:
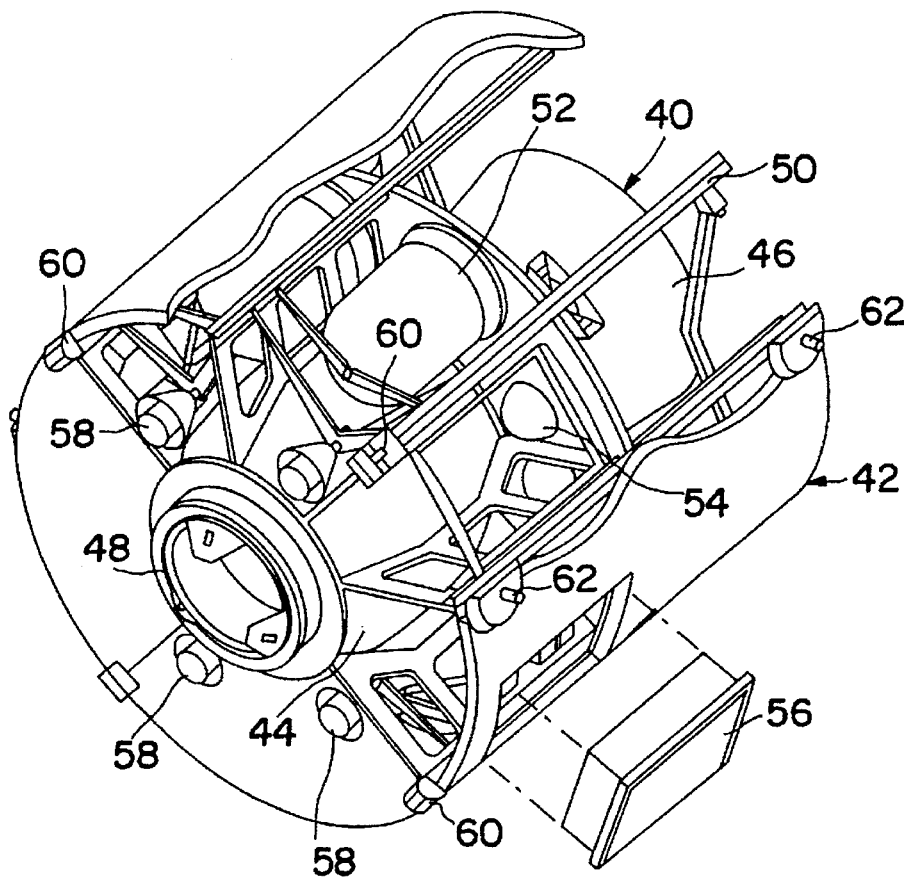
FIG. 7 is a partially-cut-away perspective view of the cylindrical-shaped encapsulating service module for the Soyuz-type orbital and descent modules.

As shown in FIGS. 6 and 7, another preferred embodiment of the present invention for a Soyuz-type spacecraft 40 is a cylindrical-shaped encapsulating service module 42 having an integral micrometeoroid shield for protecting the vehicle from the space environment. The Soyuz-type spacecraft 40 includes an orbital module 44, a descent module 46 and a docking mechanism 48. The encapsulating service module 42 includes a cylindrical-shaped load-bearing support structure 50 for attachment to the orbital module 44 and various service module components mounted internally on the support structure 50. These service module components include propellant tanks 52, environmental control and life support system tanks 54, avionics and battery units 56, main thrusters 58, and reaction control system (RCS) thrusters 60.

The avionics and battery units 56 are encased in modular units which can be accessed from the exterior of the service module 42, thus allowing the modular units to be easily tested and replaced, if necessary, while in orbit. Interface trunnions 62 are attached to the exterior of the support structure 50 for attaching the emergency descent module to the shuttle cargo bay, thus eliminating the need for a special launch cradle. The service module 42 is rigidly attached to the orbital module 44, thus joining the two structures into an integrated unit which is separated from the descent module 46 prior to reentry. Therefore, only one debris management maneuver is required to safely dispose of both service and orbital modules after separation from the descent module, instead of the usual two maneuvers.

Figure 8A:
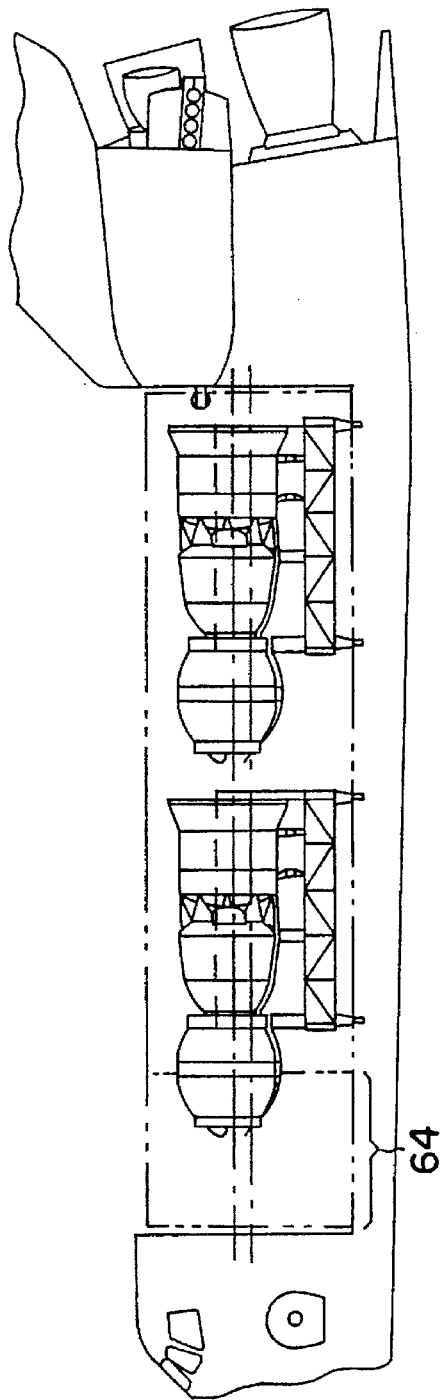
FIGS. 8a and 8b are partially-cut-away fragmented views of the U.S.-built space shuttle with two Soyuz-type emergency descent vehicles loaded for launch in the cargo bay.
Figure 8B:
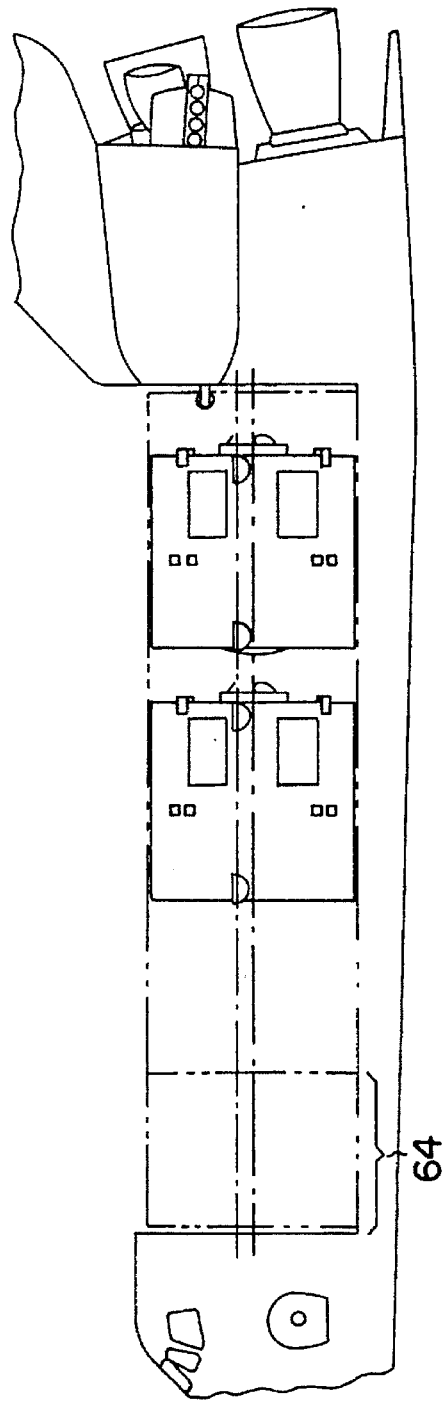

An emergency descent vehicle using the encapsulating service module of the present invention is a short, compact vehicle compared to vehicles with conventional aft-mounted service modules. FIGS. 8a and 8b show the U.S.-built space shuttle with two Soyuz-type emergency descent vehicles loaded for launch in the cargo bay. FIG. 8a shows the two Soyuz-type emergency descent vehicles with conventional aft-mounted service modules and FIG. 8b shows the descent vehicles with encapsulating service modules in accordance with the present invention. The service module of the present invention allows two vehicles to fit in the shuttle cargo bay without extending into the cargo bay forward clearance zone 64, which is required for the docking module and EVA egress.

An emergency descent vehicle using the encapsulating service module of the present invention has a more favorable load distribution for launch due to a reduction in the moment arms about the module interfaces, as well as the moment arms between the vehicle center of gravity and the trunnion interfaces with the space shuttle cargo bay. The main thrusters of the encapsulating service module face forward, which is the opposite direction of a conventional aft-mounted service module, thus allowing these thrusters to be used to back away from the space station. This eliminates the need for spring-based docking ejection mechanisms, which cause tip-off rates. An emergency descent vehicle using the encapsulating service module of the present invention can be easily increased in size to allow for additional crew members, thus accommodating an increase in the number of crew members at the space station without increasing the number of emergency descent vehicles and their station berthing ports. The reaction control system (RCS) thrusters surround the vehicle composite center of gravity, which greatly increases the control authority and efficiency of the thrusters, while avoiding the need for bigger thrusters. The encapsulating service module is preferably made of a lightweight material, such as an aluminum or graphite-epoxy material.

From the foregoing, it will be appreciated that the present invention represents a significant advance in the field of manned spacecraft. Although several preferred embodiments of the invention have been shown and described, it will be apparent that other adaptations and modifications can be made without departing from the spirit and scope of the invention. Accordingly, the invention is not to be limited, except as by the following claims.

We claim:

1. An encapsulating service module for constructing a short, compact descent vehicle having a heat shield used to protect the vehicle from overheating during descent through a planetary atmosphere, the encapsulating service module comprising:

an annular-shaped support structure for attachment around a spacecraft module that is used primarily to carry a payload during a descent from orbit; and one or more service module components mounted to the support structure, to provide services to the spacecraft module prior to a reentry maneuver;

wherein the support structure is constructed to surround a spacecraft module selected from a variety of such modules, and wherein the support structure and the one or more service components are separated from the descent vehicle prior to descent from orbit, and wherein the service module components include one or more environmental control and life support system tanks and one or more avionics and battery units.

2. The encapsulating service module as set forth in claim 1, wherein the service module components include one or more propellant tanks and one or more main and reaction control system (RCS) thrusters.

3. The encapsulating service module as set forth in claim 1, and further including a micrometeoroid shield for protecting the service and spacecraft modules from the space environment.

4. The encapsulating service module as set forth in claim 1, and further including a micrometeoroid shield that is integral with the exterior of the support structure for protecting the service and spacecraft modules from the space environment.

5. An encapsulating service module for constructing a short, compact descent vehicle, comprising:

an annular-shaped support structure for attachment around a spacecraft module selected from a variety of modules and used primarily to carry a payload during a descent from orbit, the spacecraft module having an aft end defined by a heat shield that remains attached to the spacecraft module during descent through a planetary atmosphere, and a forward end for coupling to a second spacecraft module;

one or more propellant tanks mounted to the support structure;

one or more main and reaction control system (RCS) thrusters mounted to the support structure, wherein the one or more main thrusters are mounted to the support structure to produce thrust in an aft direction, to facilitate separation from the second spacecraft module;

one or more environmental control and life support system tanks mounted to the support structure; and one or more avionics and battery units mounted to the support structure;

wherein the one or more propellant tanks, main and RCS thrusters, environmental control and life support system tanks, and avionics and battery units all provide services to the spacecraft module prior to the beginning of a reentry maneuver, but are separated from the spacecraft module, with the support structure, prior to descent of the spacecraft module through the planetary atmosphere.

6. The encapsulating service module as set forth in claim 5, wherein the spacecraft module is an Apollo-type command module and the support structure is generally conical shaped.

7. The encapsulating service module as set forth in claim 6, and further including a micrometeoroid shield for protecting the service and command modules from the space environment.

8. The encapsulating service module as set forth in claim 5, wherein the spacecraft module is an Apollo-type command module, the support structure is generally cylindrical shaped, and a micrometeoroid shield is integral with the exterior of the support structure for protecting the service and command modules from the space environment.

9. The encapsulating service module as set forth in claim 5, wherein the spacecraft module is a Soyuz-type orbital and descent module, the support structure is generally cylindrical shaped and attached to the orbital module, and a micrometeoroid shield is integral with the exterior of the support structure for protecting the service module and orbital and descent modules from the space environment.

* * * * *